Patented Feb. 23, 1932

1,846,304

UNITED STATES PATENT OFFICE

LESLIE GEORGE SCOTT BROOKER, OF ROCHESTER, NEW YORK, ASSIGNOR TO EASTMAN KODAK COMPANY, OF ROCHESTER, NEW YORK, A CORPORATION OF NEW YORK

PHOTOGAPHIC EMULSION

No Drawing.   Application filed December 31, 1930.   Serial No. 505,984.

This invention relates to a new composition of matter, and particularly to a new class of photographic sensitizing dyes, and a method for their preparation, and emulsions containing them.

As ordinary photographic emulsions are generally indifferent to those colors of the spectrum of longer wave lengths, various types of sensitizing dyes have been suggested for incorporation in photographic emulsions, or for employing over emulsions as overcoatings so as to increase the spectral sensitiveness thereof. Many cyanine dyes have been described for this purpose containing the benzothiazole nucleus, whilst classes of these photo sensitizing dyes containing the naphthothiazole nucleus are described in my co-pending applications of Serial Nos. 337,177 filed February 2, 1929; 435,104 and 435,105 filed March 12, 1930; and 437,017 filed March 19, 1930, whilst those containing the thiazoline nucleus are described in my copending application Serial No. 460,548 filed June 11, 1930 and those containing the thiazole nucleus are described in my co-pending application Serial No. 548,026 filed June 30, 1931.

An object of the present invention is to provide a process for the preparation of photosensitizing dyes of the thiocarbocyanine series containing benzothiazole nuclei and having aryl (or substituted aryl) substituents attached to the central carbon atom of the three-carbon chain.

A further object of this invention is to provide such photo-sensitizing dyes as may be added to photographic emulsions or coated thereon as an overcoating whereby the spectral sensitivity of the photographic emulsion is increased. Other objects will hereinafter appear, such as to provide a photographic emulsion which contains or in which is incorporated or which has been treated with the herein described photo-sensitizing dyes. This emulsion may be of the gelatino silver halide type or, in fact, any type of photographic silver halide emulsion customarily employed in the art.

I have found that dyes having good photo-sensitizing properties may be prepared by the treatment of a 1-methylbenzo-thiazole alkyl quaternary salt with an ortho-ester of an aromatic carboxylic acid. Ortho-esters of aromatic carboxylic acids which have been found suitable include such esters as trimethyl ortho-benzoate and trimethyl ortho-p-toluate.

The aromatic acids whose trialkyl ortho-esters are employed may be further described as possessing an aryl group directly linked to the carbon atom of the carboxyl group. This aryl group may be unsubstituted, as for example the phenyl group, or substituted, as for example the p-tolyl group. In this latter example the aryl group (phenyl) is seen to be substituted by an alkyl group (methyl) but substituents other than alkyl groups may be employed.

The reaction of a 1-methylbenzothiazole alkyl quaternary salt with one of these ortho-esters of a carboxylic acid in the presence of pyridine may be written graphically as follows:

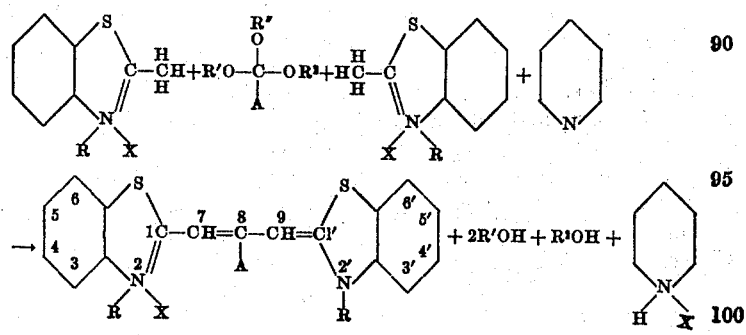

In the above structures R represents an alkyl group and X an acid radical. A stands for the aryl (or substituted aryl) group to be introduced into the three-carbon chain of the thiocarbocyanine dye and OR' and OR² represent the alkoxy groupings of the ortho-ester and these may be similar or dissimilar. The dye molecule is numbered as shown, so that a compound of this type may be described as a 2:2'-dialkyl-8-aryl (unsubstituted or substituted)-thiocarbocyanine salt.

In actual practice it is frequently desirable to carry out the condensation with an acid radical such as the p-toluene-sulfonate, which confers a comparatively high degree of solubility on the 1-methylbenzothiazole alkyl quaternary salt and on the dye. The latter is then conveniently isolated as a less soluble salt by double-decomposition in the ordinary way, such salts as ammonium or potassium bromide or iodide being employed for this purpose, usually in aqueous solution.

The —CH= group is called the methenyl group and therefore the chain $$-CH=CH-CH=$$

may be called a tri-methenyl chain, and the chain

may similarly be called a tri-methenyl chain in which the hydrogen attached to the central carbon atom has been replaced by the group denoted by the letter A.

The nomenclature and numbering of the above classes of compounds and intermediates are in accord with present usage and also the system used in my co-pending applications given above. The numbering, of course, is arbitrary and is given for the guidance of those skilled in the art in order that there be no question as to the identity of a compound covered by my invention.

The methods for the formation of the 1-methylbenzothiazoles (used in the preparation of the photographic sensitizing dyes herein described) are given in the literature. One general method consists of the conversion of the acetyl compound of an aromatic primary amine, such as p-toluidine, into the thio-acetyl compound by the action of phosphorous pentasulfide. This thio-acetyl compound is then dissolved in aqueous caustic alkali solution and oxidized with a cold aqueous solution of alkali ferricyanide whereupon the base is produced and may be extracted with ether.

The preparation of some of the ortho-esters of the aromatic carboxylic acids have not, however, been described in the literature and I will give here, therefore, one method for their preparation. These ortho-esters are prepared by taking the nitrile of the corresponding acid as the starting material. The nitrile (one mol.) is dissolved in dry absolute ethyl ether together with an alcohol (1 mol.) such as methyl or ethyl alcohol, all of the reactants being as free from water as possible and dry hydrochloric acid gas (rather more than 1 mol.) is led in, using good cooling throughout the operation. The whole is kept cold and the imino-ether hydrochloride separates and is removed by filtration when crystallization appears to be complete. It is then carefully washed with dry absolute ethyl ether and dried in a vacuum over solid caustic potash until free from all excess of hydrochloric acid. The dry imino-ether hydrochloride is then decomposed at room temperature with an alcohol, which again must be as anhydrous as possible, taking roughly 2 to 3 cc. of the alcohol for every gram of the hydrochloride. The latter dissolves more or less completely and the formation of the ortho-ester is accompanied by the separation of ammonium chloride, the formation of which may be used as an indication of the course of the reaction. The reaction vessel is tightly stoppered and allowed to stand for several days or even several weeks until the reaction is apparently complete. The insoluble material is then filtered off and the excess alcohol is removed by distillation, filtering again if necessary. The ester is finally distilled over, using diminished pressure as a rule, and is purified by refractionation. Thus benzonitrile on treatment with ethyl alcohol and hydrochloric acid gas in the manner described above yields benzo-imino-ethyl-ether hydrochloride, and this, when subjected to the action of ethyl alcohol in the manner described, yields triethylortho-benzoate. Similarly, p-tolylcyanide or p-tolunitrile yields trimethyl ortho-p-toluate. The ortho-esters of other aromatic acids may be prepared in a similar manner, and mixed esters may be made by taking two different alcohols for the two separate steps of the reaction.

I will now give several examples for preparing various dyes referred to, but it will be understood that they are merely representative of a great number of reactions in which the proportions given and equivalents used may vary in accord with the particular type of dye required. My invention, therefore, will not be restricted thereby except as indicated in the appended claims.

The 1-methylbenzothiazole used in any of the described condensations may be unsubstituted in the benzene nucleus or it may be substituted therein, as for example by a fused-on benzene nucleus, as described in my co-pending application Serial No. 435,104.

EXAMPLE 1

*2:2'-dimethyl-8-phenylthiocarbocyanine bromide.*—16.8 g. (1 mol.) 1-methylbenzothiazole metho-p-toluene-sulfonate was refluxed for one hour with 11.2 g. (1 mol.) triethyl ortho-benzoate and 50 cc. pyridine. The hot solution was then treated with 20 g. potassium bromide dissolved in 65 cc. hot water. A solid felted mass of crystals was formed but on standing, with occasional stirring, this all became granular. The crystals were filtered off, well washed with water and then with acetone and dried. 7.5 g. of dull greenish-brown crystals were obtained and these, re-crystallized from methyl alcohol yielded beautiful large bronze-like crystals.

EXAMPLE 2

*2:2' - diethyl - 8 - phenylthiocarbocyanine bromide.*—35 g. (1 mol.) 1-methylbenzothiazole etho-p-toluene-sulfonate was refluxed for one hour with 22.4 g. (1 mol.) triethyl ortho-benzoate (prepared from benzonitrile) and 25 cc. dry pyridine. A solution of 30 g. potassium bromide in 75 cc. of hot water was added and the whole allowed to stand overnight. The crystals were filtered off and washed successively with ether, cold acetone, cold water and again cold acetone and dried at 110°. Weight 16.1 g. The dye was re-crystallized from methyl alcohol, in which it gave a bluish-red solution, and formed beautiful large prisms, with well shaped faces which reflected greenish-blue light.

EXAMPLE 3

*2:2':5:5'-tetramethyl-8-phenylthiocarbocyanine bromide.*—5 g. (1 mol.) 1:5-dimethylbenzothiazole was heated overnight at 100–110° C. with 5.7 g. (1 mol.) methyl p-toluenesulfonate, and the product refluxed for one hour with 6.9 g. (1 mol.) triethyl ortho-benzoate and 15 cc. pyridine. The reaction mixture was then treated with a solution of 10 g. potassium bromide in 50 cc. hot water, when a bulky precipitate formed which rapidly became crystalline on stirring. When the whole was cold the crystals were filtered off, well washed with cold water and cold acetone and dried. 5.1 g. of dark crystals with a bronze reflex were obtained, which yielded minute dark greenish-brown crystals on recrystallization from methyl alcohol. The solution in this solvent was bluish-red.

EXAMPLE 4

*2 : 2' - diethyl - 8 - p - tolylthiocarbocyanine iodide.*—14 g. (1 mol.) 1-methylbenzothiazole etho-p-toluenesulfonate was refluxed for one hour with 15.7 g. (2 mols.) trimethyl ortho-p-toluate (prepared from p-tolunitrile) and 45 cc. dry pyridine. On treating with a solution of 20 g. potassium iodide in 100 cc. water and allowing to stand overnight the dye was precipitated and was obtained after filtering and washing as a dull greyish mass with coppery crystals and also blue crystals visible as well. Weight when dried at 110° 3.9 g.

10.4 g. of such a mixture as the above was boiled out with successive portions of methyl alcohol, filtering hot each time, until only a small amount of green crystalline material remained in the residue The filtrate, on cooling slowly, deposited large green crystals of the dye sought for, as well as smaller crystals of an impurity. The latter were best removed by flotation in carbon tetrachloride, when the large green crystals floated on the surface and the impurity was suspended in the body of the liquid, and could be drawn off with a pipette. 1.76 g. of green crystals were so obtained, fairly pure, and were obtained quite pure (1.255 g.) on crystallizing from 75 cc. methyl alcohol. The dye gave a bluish-red solution in methyl alcohol.

By substituting various unsubstituted or substituted aryl groups in the position in the structural formula of the dye occupied by the letter A, and alkyl groups in the two positions occupied by the letter R, many sensitizing dyes may be obtained. The letter X indicates any suitable anion such, for example, as a halide, p-toluenesulfonate, alkylosulphate, nitrate, acetate, perchlorate, or, in fact, any salt forming anion that will not render the dye two sparingly soluble or deleteriously affect the photographic sensitizing properties of the dye.

In the preparation of emulsions containing these photo-sensitizers, it has been found that the dye may be dissolved in methyl alcohol and a volume of solution containing from 5 to 100 milligrams of dye added to 1000 cc. of emulsion. While it may not be necessary to add some of the sensitizers in a large amount, it may be necessary to add others in amounts larger than those given above, generally about 10 to 20 milligrams is sufficient to obtain the maximum sensitizing effect with a dye having good sensitizing power. The more powerful dyes, however, may require much less. The regulation or adoption of the most economical proportions will be apparent to those skilled in the art upon observing the sensitizing power of the particular dye for the particular emulsion to be formed. The above examples are, therefore, illustrative and not to be understood as limiting the invention in any sense, as it will be apparent that these dyes may be incorporated by other methods in many of the photographic emulsions customarily employed in the art, such for instance as by bathing the plate or film, upon which the emulsion has been coated, in a solution of the dye in an appropriate solvent although this method of incorporating the dye in the emulsion is not preferred over that above described. Obviously the claims are all intended to cover any combination of these dyes with a photographic emulsion whereby the dye exerts a sensitizing effect upon the emulsion.

It is apparent from a thorough consideration of the above description that any thiocarbocyanine dye prepared from a 1-methylbenzothiazole unsubstituted or substituted in which the 8 position is substituted by an aryl group (itself unsubstituted or substituted), will come within the scope of this invention whatever may be the radicals occupying the other substitutable positions of the structure, together with the employment of such dyes for photographic sensitizing and other purposes.

Furthermore, it will also be apparent that the genus claimed hereinafter not only includes the foregoing but also includes any carbocyanine dye containing two of the five membered rings

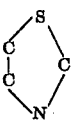

linked together by a tri-methenyl chain, the hydrogen attached to the central carbon atom of which is substituted by an aryl or substituted aryl group such as, for example, the 8-substituted thiocarbocyanines derived from mu-methylnaphthothiazole described in my application #435,104, the 7-substituted thiazolinocarbocyanines derived from 2-methylthiazoline described in my application #460,548 and the 7-substituted thiazolocarbocyanines derived from 2-methylthiazole described in my application Ser. No. 548,026. In the claims, therefore where (1) an aryl group or (2) an aromatic carboxylic acid is referred to it is definitely intended that such shall include, respectively, (1) both an unsubstituted and a substituted aryl group or (2) an aromatic carboxylic acid having an unsubstituted aryl group directly linked to the carbon atom of the carboxyl group and an aromatic carboxylic acid having a substituted aryl group directly linked to the carbon atom of the carboxyl group.

What I claim as my invention and desire to be secured by Letters Patent of the United States is:

1. A photographic gelatino silver halide emulsion which contains a carbocyanine dye comprising two heterocyclic rings of the structure

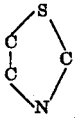

linked together by a tri-methenyl chain, the hydrogen of the central carbon atom of which has been substituted by an aryl radical.

2. A photographic gelatino silver halide emulsion which contains a carbocyanine dye resulting from the condensation of two molecular proportions of a compound containing a heterocyclic ring of the structure

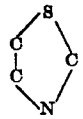

with one molecular proportion of an ortho-ester of a monobasic aromatic carboxylic acid.

3. A photographic gelatino silver halide emulsion which contains a thiocarbocyanine dye substituted in the 8 position with an aryl radical.

4. A photographic gelatino silver halide emulsion which contains a thiocarbocyanine dye substituted in the 8 position with an aryl radical, said dye containing two benzothiazole nuclei.

5. A photographic gelatino silver halide emulsion which contains a 2:2'-dialkyl-8-arylthiocarbocyanine salt.

6. A photographic gelatino silver halide emulsion which a 2:2'-dialkyl-8-arylthiocarbocyanine salt, said salt containing two benzothiazole nuclei.

7. A photographic gelatino silver halide emulsion which contains a thiocarbocyanine dye resulting from the condensation of two molecules of a 1-methylbenzothiazole alkyl quaternary salt with an ortho-ester of a monobasic aromatic carboxylic acid.

8. A photographic gelatino silver halide emulsion which contains a 2:2'-dialkyl-8-phenylthiocarbocyanine salt.

9. A photographic gelatino silver halide emulsion which contains a 2:2'-dialkyl-8-phenylthiocarbocyanine halide.

10. A photographic gelatino silver halide emulsion which contains 2:2'-dialkyl-8-phenylthiocarbocyanine bromide.

11. A photographic gelatino silver halide emulsion which contains 2:2'-dimethyl-8-phenylthiocarbocyanine bromide.

12. A photographic gelatino silver halide emulsion which contains 2:2'-diethyl-8-phenylthiocarbocyanine bromide.

13. A photographic gelatino silver halide emulsion which contains a 2:2'-diethyl-8-p-tolylthiocarbocyanine bromide.

14. A photographic gelatino silver halide emulsion which contains a 2:2'-diethyl-8-p-tolylthiocarbocyanine salt.

15. As an article of manufacture, a supporting surface coated with photographic gelatino silver halide emulsion including a 2:2'-dialkyl-8-arylthiocarbocyanine salt.

Signed at Rochester, N. Y., this 29th day of December, 1930.

LESLIE GEORGE SCOTT BROOKER.

Certificate of Correction

Patent No. 1,846,304.　　　　　　　　　　　　　　Granted February 23, 1932, to

LESLIE GEORGE SCOTT BROOKER

It is hereby certified that error appears in the printed specification of the above-numbered patent requiring correction as follows: Page 1, lines 90 to 95, strike out the formula and insert instead—

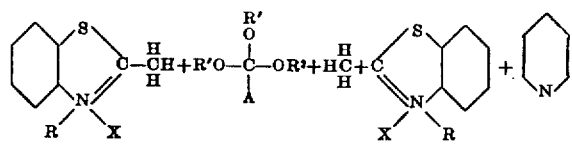

and that the said Letters Patent should be read with this correction therein that the same may conform to the record of the case in the Patent Office.

Signed and sealed this 26th day of April, A. D. 1932.

[SEAL.]　　　　　　　　　　　　　　　　　　　　M. J. MOORE,
　　　　　　　　　　　　　　　　　　　　　　　*Acting Commissioner of Patents.*